US006971654B2

(12) United States Patent  (10) Patent No.: US 6,971,654 B2
Amsili  (45) Date of Patent:  Dec. 6, 2005

(54) COMPACT COLLAPSIBLE CART WITH VERTICAL LIFT

(76) Inventor: Marc A. Amsili, 5608 Sedona Dr., Austin, TX (US) 78759

( * ) Notice: Subject to any disclaimer, the term of this patent is extended or adjusted under 35 U.S.C. 154(b) by 16 days.

(21) Appl. No.: 10/465,331

(22) Filed: Jun. 19, 2003

(65) Prior Publication Data

US 2004/0256818 A1  Dec. 23, 2004

(51) Int. Cl.$^7$ ................................................ B62B 1/08
(52) U.S. Cl. ............... 280/47.2; 280/47.29; 280/47.27; 280/47.28
(58) Field of Search .................... 280/47.29, 47.34, 280/47.37, 47.2, 47.315, 47.27, 47.28, 47.18, 280/655.1, 655, 654, 35, 47.316

(56) References Cited

U.S. PATENT DOCUMENTS

| | | | |
|---|---|---|---|
| 795,147 A | 7/1905 | Magoffin | |
| 2,516,260 A | 7/1950 | Schildmeier | |
| 3,052,323 A | 9/1962 | Hopfeld | |
| 3,079,168 A * | 2/1963 | Monroe | .................... 280/47.28 |
| D200,634 S | 3/1965 | Raye | |
| 3,698,736 A | 10/1972 | Shape | |
| 3,704,799 A | 12/1972 | Morris, Jr. | |
| 3,893,687 A | 7/1975 | Victor | |
| 3,998,476 A * | 12/1976 | Kazmark, Sr. | ............... 280/655 |
| 4,315,632 A | 2/1982 | Taylor | |
| 4,458,914 A * | 7/1984 | Holtz | .......................... 280/654 |
| 4,618,035 A * | 10/1986 | Mao | .......................... 190/18 A |
| 4,630,837 A * | 12/1986 | Kazmark | .................... 280/47.2 |
| 4,886,233 A | 12/1989 | Bateman et al. | |
| 4,896,897 A | 1/1990 | Wilhelm | |
| 4,917,401 A * | 4/1990 | Iwaki | .......................... 280/655 |
| 4,953,888 A * | 9/1990 | Stein | ........................... 280/654 |
| 5,127,664 A * | 7/1992 | Cheng | ........................ 280/655 |
| 5,251,922 A | 10/1993 | Mann | |
| 5,263,727 A * | 11/1993 | Libit et al. | ..................... 280/40 |
| 5,489,183 A | 2/1996 | Malden et al. | |
| 5,549,317 A | 8/1996 | Dunkle | |
| 5,590,897 A * | 1/1997 | Tsai | ........................... 280/655 |
| 5,769,431 A | 6/1998 | Cordova | |
| 5,797,617 A * | 8/1998 | Lin | .............................. 280/655 |
| 5,885,047 A * | 3/1999 | Davis et al. | ................. 414/490 |
| 5,938,396 A | 8/1999 | Audet | |
| 5,941,543 A * | 8/1999 | Kazmark, Jr. | ............ 280/47.29 |
| 5,951,037 A * | 9/1999 | Hsieh et al. | ................ 280/655 |
| 6,102,433 A * | 8/2000 | Stevens | ....................... 280/646 |
| 6,375,202 B2 | 4/2002 | Weck et al. | |

(Continued)

FOREIGN PATENT DOCUMENTS

BE        1012085        4/2000

(Continued)

*Primary Examiner*—J. Allen Shriver
(74) *Attorney, Agent, or Firm*—Bracewell & Giuliani LLP

(57) ABSTRACT

A hand truck or cart has a frame with telescopic segments and wheels mounted to a lower end of the frame for maneuvering the frame on a support surface. The frame has an extended position for operational use and a collapsed position for storage purposes. When the frame is in the collapsed position, it has a vertical height that is only a fraction of its height when in the extended position. Each of the telescopic arms have locking elements for securing the frame in the extended position. The cart also has pivotable support and fork platform for supporting the loads. The support platform can be raised and lowered along the length of the frame with a winch assembly that is mounted to the frame. The cart is also provided with a pair of supplemental support legs for providing additional support for the frame.

9 Claims, 4 Drawing Sheets

U.S. PATENT DOCUMENTS

| | | | |
|---|---|---|---|
| 6,425,599 B1 * | 7/2002 | Tsai | 280/652 |
| 6,447,022 B1 * | 9/2002 | Allen | 285/305 |
| 6,530,740 B2 * | 3/2003 | Kim | 414/490 |
| 6,557,869 B2 * | 5/2003 | Gillette et al. | 280/47.28 |
| 2003/0025287 A1 * | 2/2003 | Kady | 280/47.29 |
| 2004/0108669 A1 * | 6/2004 | Tsai | 280/47.29 |
| 2004/0155418 A1 * | 8/2004 | Middleby | 280/47.29 |

FOREIGN PATENT DOCUMENTS

| | | |
|---|---|---|
| DE | 8209286 | 8/1982 |
| DE | 8713561 | 12/1987 |

* cited by examiner

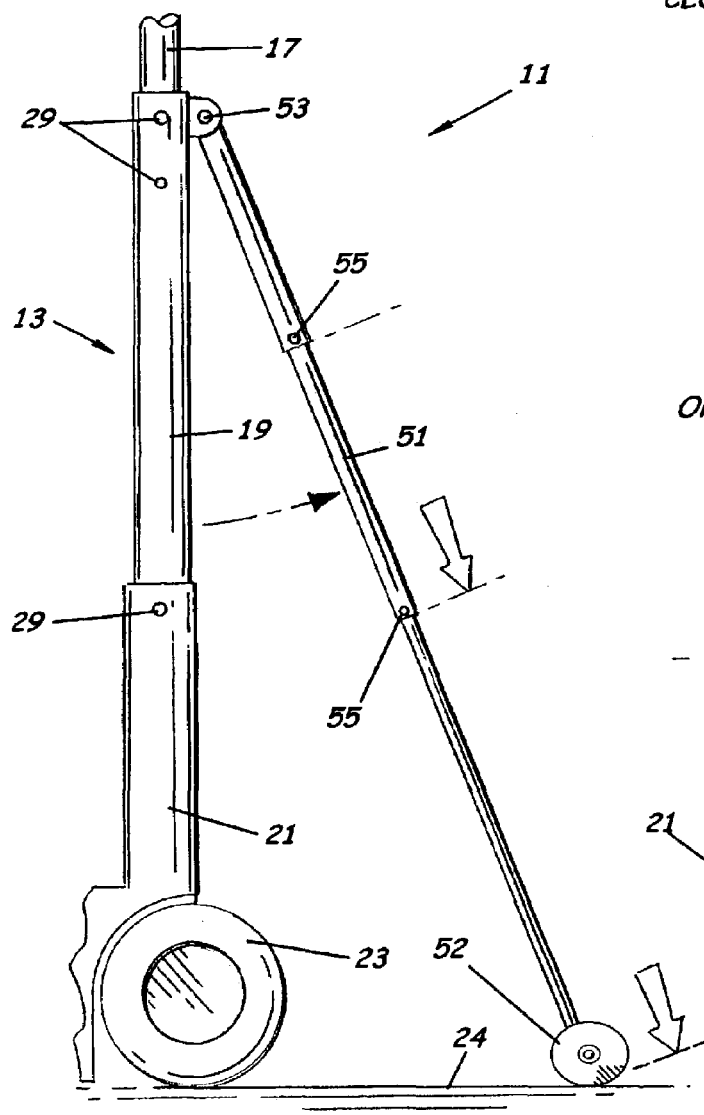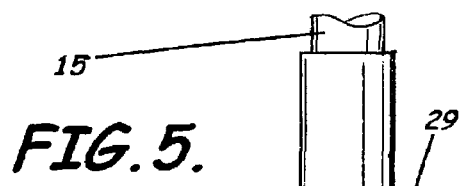

US 6,971,654 B2

COMPACT COLLAPSIBLE CART WITH VERTICAL LIFT

BACKGROUND OF THE INVENTION

1. Technical Field

The present invention relates in general to an improved hand cart and, in particular, to an improved hand cart that is collapsible into a compact storage position, and which is capable of elevating loads when placed on a platform thereof.

2. Description of the Prior Art

Hand trucks for transporting objects have been in use for many years. Such hand trucks are generally comprised of a toe plate which is fixed in a perpendicular orientation to a support frame, with a set of wheels located in approximately at the connection point. The toe plate is loaded with objects, either by placing objects directly thereon or by sliding the toe plate underneath the object. The support frame is then grasped by the operator and the wheels are temporarily immobilized while the operator rotates the support frame to lift the toe plate, and the objects placed thereon, until only the wheels remain on the ground. The hand truck can then be rolled by the operator to transport the objects thereon to a desired location. When it is desired to unload the hand truck the wheels are again immobilized and the toe plate is again rotated until it rests on the ground. The operator then may remove objects from the hand truck or may remove the hand truck by removing the toe plate from beneath the objects.

It has often been desirable for certain types of lifting requirements to modify the standard hand truck to make it more useful to the operator during loading and unloading thereof. Such modifications usually include a toe plate which is movable along the support frame in such a manner that the toe plate maybe adjusted to a convenient position for either loading or unloading of objects thereon. A hand truck exemplary of this design is shown in U.S. Pat. No. 3,052,323 to Hopfeld, which shows a hand truck having a movable toe plate which is adjustable along the frame by means of a chain and hydraulic pump.

There are also numerous commercialized household carts for carrying household items, such as groceries, beverages and some items of wearing apparel. These prior art household carts have frequently included a pair of wheels mounted on a basket. A handle, frequently having an inverted U-shape, usually extends from the basket and, in certain configurations, telescopes with respect to the basket. Some of the baskets are foldable, for ease of storage in automotive vehicles and residences. The typical prior household carts have limited volumetric and weight capacity. Moreover, the prior art household carts have generally been incapable of carrying substantial loads. Also, the prior art household carts have generally been difficult to manage on steps or street curbs.

Because of these problems, the prior art household carts have met with only limited success. Consequently, the vast majority of householders transport household items between their automotive vehicles and residence by hand. This frequently necessitates several back and forth trips to transport relative cumbersome items, such as groceries, particularly heavy items such as cases of beverages. Further, many household carts are relatively expensive and difficult to maneuver. Thus, there is a need for an improved cart or hand truck that is versatile, light weight, capable of elevating and transporting relatively heavy loads, and which is compact when stored.

SUMMARY OF THE INVENTION

One embodiment of cart constructed in accordance with the present invention has a frame with hollow telescopic arm segments. Each segment is positionable within the segment located immediately below it, other than the lowermost segment. The cart has wheels mounted to a lower end of the frame for maneuvering the frame on a support surface. The frame has an extended position for operational use and a collapsed position for storage purposes. When the frame is in the collapsed position, it has a vertical height that is only a fraction of its height when in the extended position. Each of the telescopic arms have locking elements for securing the frame in the extended position.

The cart also has a pivotable support platform and a pivotable support fork that are mounted to the frame adjacent to the wheels for supporting loads. The support platform can be raised and lowered along the length of the frame with a winch assembly that is mounted to the frame. The support platform is typically located in the support fork and is substantially co-planar with the support fork when the support platform is in its lowermost position. The cart is also provided with a pair of supplemental support legs for providing additional support and mobility for the frame on the support surface. The supplemental support legs also may be provided with wheels for even greater mobility.

The cart is used for transporting loads while in the operational position. If desired, the loads may be vertically lifted while positioned on the support platform via the winch assembly. The supplemental support legs provide additional support for the cart to prevent incidental rearward tipping, especially when a load is elevated on the support platform. Because the support legs are telescopic and may be secured with locking elements, the angle of tilt of the cart may be adjusted according to the application. For convenience and compact storage, the cart may be collapsed down to a small fraction of its operational position in the collapsed position.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 4 is a side elevational view of a lower rear portion of the hand truck of FIG. 1 illustrating additional support leg features thereof with wheels and is constructed in accordance with the present invention.

FIG. 5 is a partial side elevational view of the hand truck of FIG. 1 illustrating locking/release features of the telescopic frame thereof and is constructed in accordance with the present invention.

DETAILED DESCRIPTION OF THE INVENTION

Figure 1:
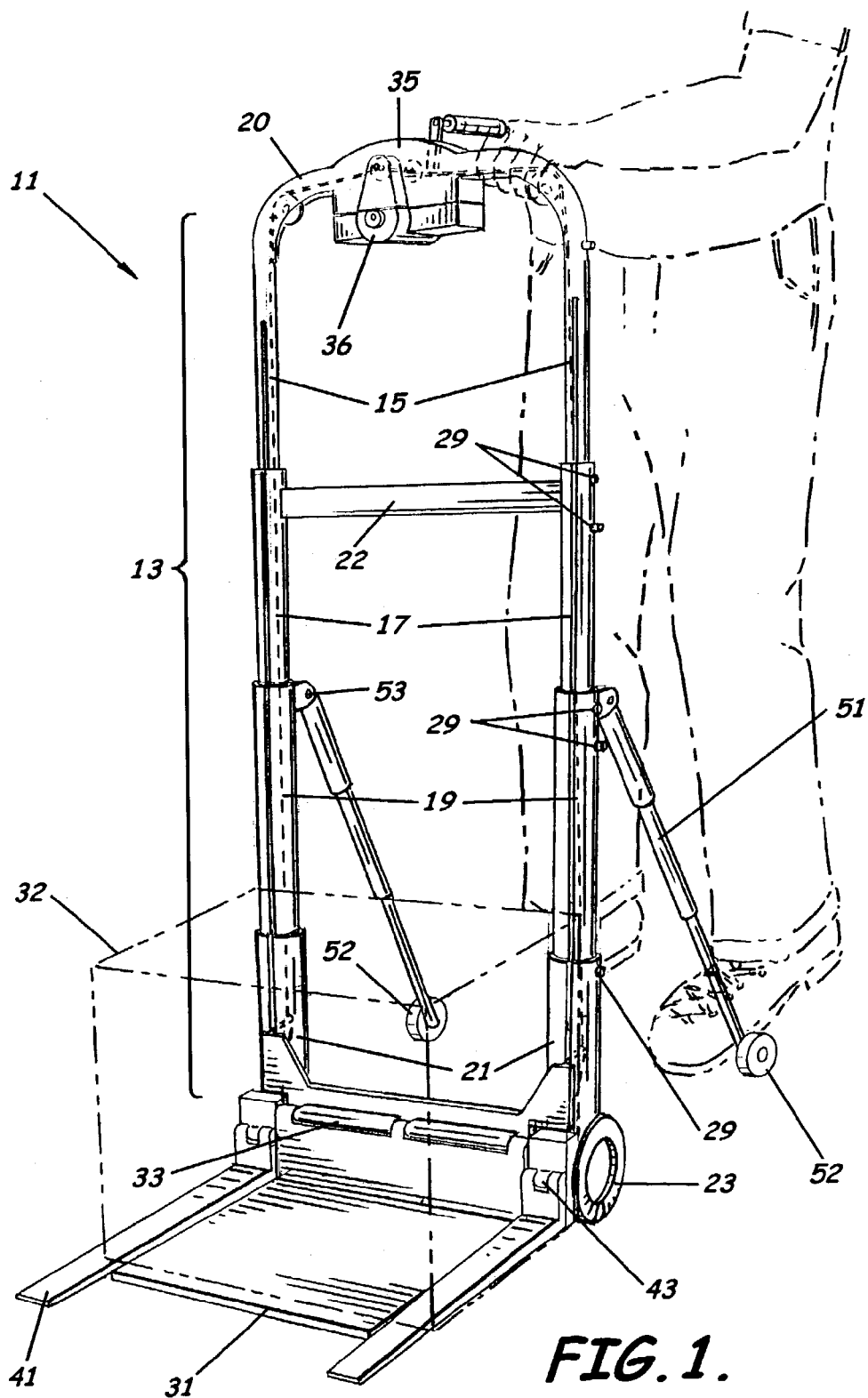
FIG. 1 is an isometric view of one embodiment of a hand truck in a fully operational position and is constructed in accordance with the present invention.

Referring to FIGS. 1–5, one embodiment of a compact collapsible hand truck or cart 11 constructed in accordance with the present invention is shown. The cart 11 comprises a frame 13 (FIG. 1) having a plurality of telescopic members that, in the embodiment shown, includes four symmetrical sets 15, 17, 19, and 21 of telescopic arm segments. In the version illustrated, each "set" 15, 17, 19, 21 essentially comprises a pair of hollow tubes. The tubes of the uppermost set 15 are joined by, for example, a contiguous and integrated handle 20 at their upper ends. The tubes of the next lower set 17 are joined by, for example, a flat support brace 22. Each set 15, 17, 19, and 21 is positionable within the set located immediately below the previous set, other than the lowermost set 21, which forms a base for the frame 13. Cart 11 also has a plurality of wheels 23 mounted to a lower end of the frame 13 for maneuvering the frame on a support surface 24 (FIG. 4).

Figure 2:
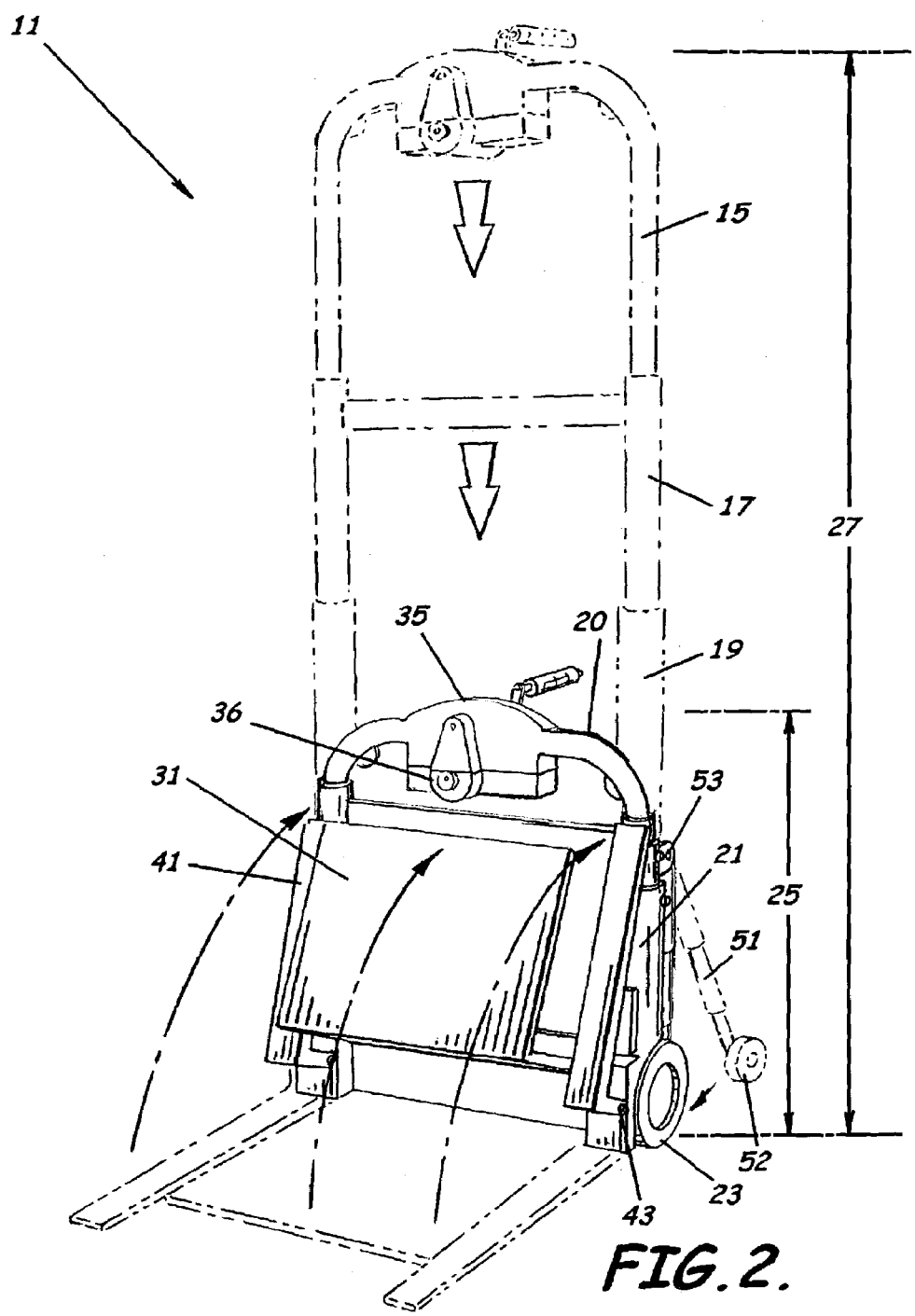
FIG. 2 is an isometric view of the hand truck of FIG. 1 in a collapsed, storage position and is constructed in accordance with the present invention.
Figure 3:
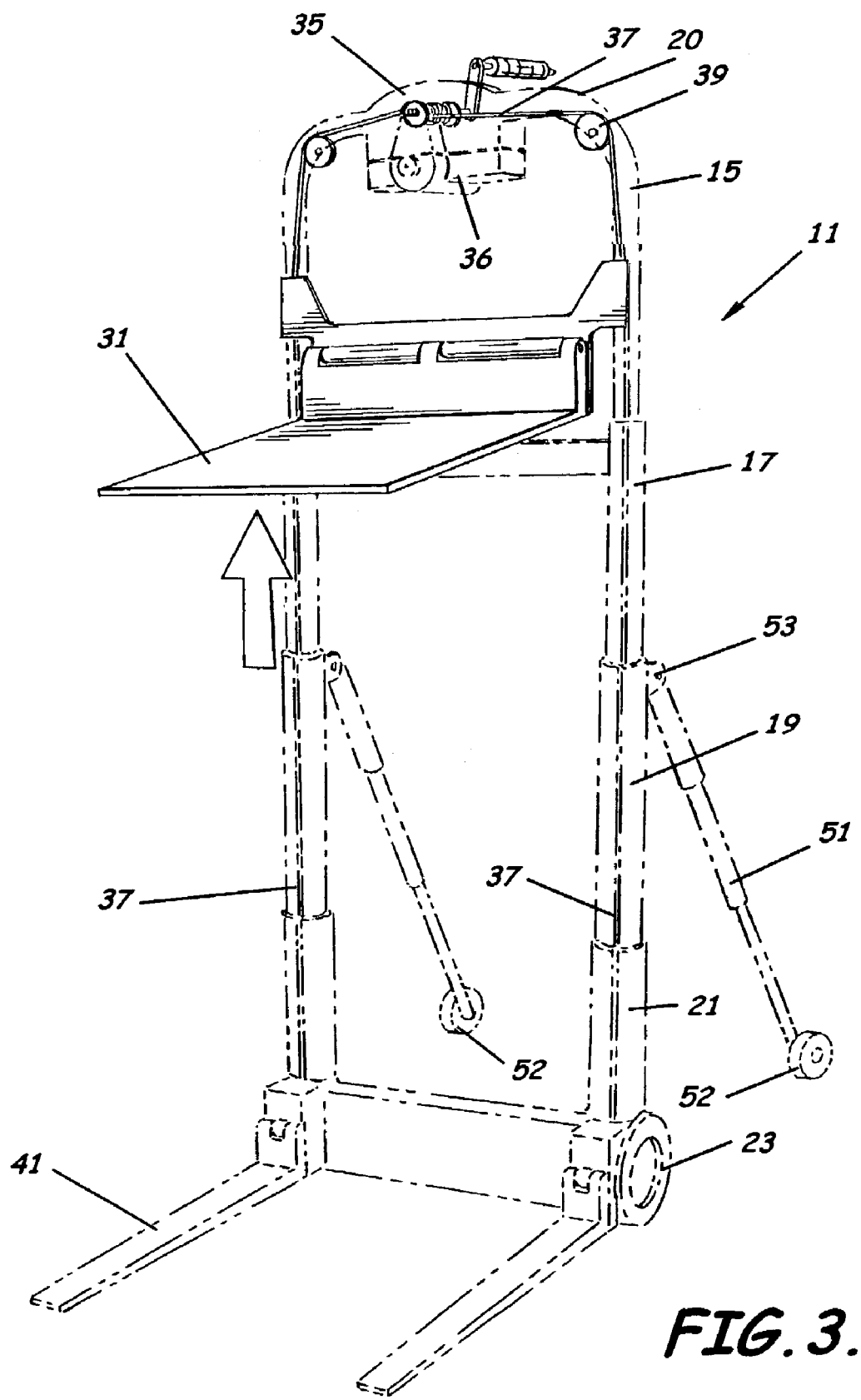
FIG. 3 is an isometric view of the hand truck of FIG. 1 illustrating a feature for elevating a load and is constructed in accordance with the present invention.

The frame 13 has an extended or fully deployed position as shown in solid lines in FIG. 1 and phantom lines in FIGS. 2 and 3. In the extended position, the sets 15, 17, 19, and 21 of telescopic members are deployed for operational use. The frame 13 also has a collapsed position (also known as a non-operational or storage position) as shown by the solid lines in FIG. 2. In the collapsed position, the sets 15, 17, 19, and 21 of the telescopic members are retracted for storage purposes. Moreover, when the frame 13 is in the collapsed position, the frame 13 has a vertical height 25 (FIG. 2) that is only a fraction (less than half, or approximately one-third) of a height 27 of the frame 13 when in the extended position.

In order to maintain the frame 13 in either the extended position or in the collapsed position, the sets 15, 17, 19, and 21 of the telescopic members are provided with a plurality of locking elements 29 (FIGS. 1, 4, and 5), such as detents, that are mounted to the telescopic members for securing the frame 13 in either position. The locking elements 19 may comprise, for example, detents for engaging and disengaging adjacent ones of the sets 15, 17, 19, and 21 of telescopic members. Alternatively, the locking elements 29 may be used to secure and lock the frame only in the extended position.

The cart 11 of the present invention also includes a support platform 31 that is mounted to the frame 13 adjacent to the wheels 23. The support platform 31 is adapted to support a load 32 (see phantom-lined box in FIG. 1) that is placed thereon. The support platform 31 is pivotable (see FIG. 2) about a pivot 33 (FIG. 1) relative to the frame 13 between a support position (solid lines in FIG. 1, phantom lines in FIG. 2) such that the frame 13 is supported in an upright position on the support surface 24 (FIG. 4) during operational use. The support platform 31 also has a storage position (solid lines of FIG. 2) such that the support platform 31 is folded against the frame 13 for storage purposes.

Another feature of the support platform 31 is that it can be raised and lowered (see FIG. 3) via a winch assembly 35 that is mounted, for example, to the handle 20 of the frame 13. In the embodiment shown, the winch assembly 35 is centrally mounted to the handle 20 with respect to the frame 13.

The winch assembly 35 has a cable assembly 37 that is secured to the support platform 31 for moving the support platform 31 vertically relative to and along most of the length of the frame 13. In the embodiment shown, the cable assembly 37 utilizes pulleys 39 and is at least partially mounted within the hollow tubes of the sets 15, 17, 19, 21 of the telescopic segments. In an alternate embodiment, the support platform 31 may be locked to the lower end of the frame 13 such that, after locking elements 29 are released, the winch assembly 35 is used to retract the frame from the extended position down to the collapsed position. In another alternate embodiment, the winch assembly 35 may be automated with a motor and power source 36, such as a battery, for ease of use by the elderly and/or the handicapped.

Referring again to FIG. 1, the cart 11 also comprises a support fork 41 that is mounted to the frame 13 adjacent to the support platform 31 and the wheels 23. Like support platform 31, the support fork 41 is adapted to support a load 32 that is placed thereon. The support fork 41 is independently pivotable about a pivot 43 (FIG. 2) relative to the frame 13 and the support platform 31. The support fork 41 has a support position (solid lines of FIG. 1 and phantom lines of FIG. 2) such that the frame 13 is supported in an upright position on the support surface 24 for operational use. The support fork 41 also has a storage position (solid lines of FIG. 2) such that the support fork 41 is folded against the frame 13 for storage and/or non-operational purposes. In the embodiment shown, the support platform 31 is located between or in the tines of the support fork 41 and is substantially co-planar with the support fork 41 when the support platform 31 is in its lowermost position.

Yet another feature of the present invention are additional or supplemental support legs 51. The support legs 51 are movably mounted to the frame 13 for providing additional support and mobility for the frame 13 on the support surface 24 (FIG. 4). For even greater mobility, supplemental support legs 51 may be provided with wheel assemblies 52 at their lower ends. The user of the cart 11 may selectively employ the support legs 51, which are preferably mounted to a rear portion of the frame 13. As best shown in FIG. 4, the support legs 51 are pivotable about pivots 53 and telescopically movable between a retracted position (compare FIG. 2) adjacent to the frame 13 and an extended position (FIGS. 1, 3, and 4) for engaging the support surface 24. The sets of telescopic segments and, optionally, locking elements 55 for support legs 51, may be formed in a manner similar to the sets 15, 17, 19, 21 and locking elements 29 generally described above for the frame 13 of the cart 11.

In operation, the cart 11 of the present invention is used for transporting loads, such as box 32 (FIG. 1), while in the operational position shown in FIG. 1. If desired, loads may be vertically lifted while positioned on the support platform 31, as illustrated in FIG. 3, via winch assembly 35 and its associated cable assembly 37. The supplemental support legs 51 provide additional support and mobility for the cart 11 to prevent incidental rearward tipping, especially when a load is elevated on the support platform 31. Because the support legs 51 are telescopic and may be secured with locking elements, the angle of tilt of the cart 11 may be adjusted according to the application. For convenience and compact storage, the cart 11 maybe collapsed down to a small fraction of its operational position in the collapsed position (FIG. 2).

The present invention has several advantages. A cart constructed in accordance with the present invention uses a frame with hollow telescopic arm segments to move the frame between an extended position for operational use and a collapsed position for storage purposes. When the frame is in the collapsed position, it has a vertical height that is only a fraction of its height when in the extended position. The cart also has a pivotable support platform and a pivotable support fork that are mounted to the frame adjacent to the wheels for supporting loads. The support platform can be raised and lowered along the length of the frame with a winch assembly that is conveniently mounted to a central portion of the handle of the frame. The cart is also provided with a pair of supplemental support legs for providing additional support for the frame on the support surface.

While the invention has been shown or described in only some of its forms, it should be apparent to those skilled in the art that it is not so limited, but is susceptible to various changes without departing from the scope of the invention.

What is claimed is:

1. A cart, comprising:
   a frame having a handle and a plurality of telescopic members for movement between an extended position such that the telescopic members are deployed, and a collapsed position such that the telescopic members are retracted;
   a plurality of wheels mounted to a lower end of the frame for maneuvering the frame on a support surface;
   a support platform mounted to the frame adjacent to the wheels and adapted to support a load placed thereon, the support platform being pivotable relative to the frame between a support position such that the frame is supported in an upright position on the support surface for operational use, and a storage position such that the support platform is folded against the frame for storage purposes; and
   a winch assembly centrally mounted to the handle of the frame relative to the telescopic members and having a cable assembly that is secured to the support platform for moving the support platform vertically relative to the frame; and
   support legs mounted to the frame, the support legs having wheels mounted to lower ends thereof for providing additional support and mobility for the frame on the support surface, the support legs being mounted to a rear portion of the frame and are pivotable and telescopically movable between a refracted position adjacent to the frame and an extended position.

2. The cart of claim 1, wherein the plurality of telescopic members comprises four symmetrical sets of telescopic arm segments, such that each set, other than a lowermost set, is positionable within a set located inunediately below said each set when the frame is in the collapsed position.

3. The cart of claim 1, further comprising a plurality of locking elements mounted to the telescopic members for securing the frame in either the extended position or in the collapsed position, wherein the locking elements comprise detents for engaging and disengaging adjacent ones of the plurality of telescopic members.

4. The cart of claim 1, further comprising a support fork pivotally mounted to the frame adjacent to the support platform and adapted to support a load placed thereon during operational use, wherein the support platform is vertically movable relative to the support fork, and the support fork having a storage position such that the support fork is folded against the frame for storage purposes.

5. A cart, comprising:
   a frame having a plurality of telescopic members for movement between an extended position such that the telescopic members are deployed for operational use, and a collapsed position such that the telescopic members are retracted for storage purposes, and, when the frame is in the collapsed position, the frame has a vertical height that is approximately one-third of a height of the frame when in the extended position;
   a plurality of locking elements mounted to the telescopic members for securing the frame in either the extended position or in the collapsed position;
   a plurality of wheels mounted to a lower end of the frame for maneuvering the frame on a support surface;
   a support platform mounted to the frame adjacent to the wheels and adapted to support a load placed thereon, the support platform being pivotable relative to the frame between a support position such that the frame is supported in an upright position on the support surface during operational use, and a storage position such that the support platform is folded against the frame for storage purposes;
   a winch assembly centrally mounted to the frame relative to the telescopic members and having a cable assembly that is secured to the support platform for moving the support platform vertically relative to the frame;
   a support fork mounted to the frame adjacent to the support platform and adapted to support a load placed thereon, the support fork being pivotable relative to the frame and the support platform between a support position such that the frame is supported in an upright position on the support surface for operational use, and a storage position such that the support fork is folded against the frame for storage purposes; and
   support legs movably mounted to the frame, each of the support legs having a wheel mounted thereto for providing additional support and mobility for the frame on the support surface.

6. The cart of claim 5, wherein the plurality of telescopic members comprises four symmetrical sets of telescopic arm segments, such that each set is positionable within a set located immediately below said each set, other than a lowermost set, when the frame is in the collapsed position.

7. The cart of claim 5, wherein the locking elements comprise detents for engaging and disengaging adjacent ones of the plurality of telescopic members.

8. The cart of claim 5, wherein the support legs are mounted to a rear portion of the frame and are pivotable and telescopically movable between a refracted position adjacent to the frame and an extended position for engaging the support surface.

9. The cart of claim 5, wherein the support platform is located in the support fork and is substantially co-planar with the fork, and wherein the frame has a handle and the winch assembly is mounted to the handle.

* * * * *